(No Model.)

J. P. BIRMINGHAM.
NUT LOCK.

No. 589,689. Patented Sept. 7, 1897.

Witnesses:
L. C. Hills
A. L. Hough

Inventor:
John P. Birmingham
by
Franklin H. Hough
Atty.

United States Patent Office.

JOHN P. BIRMINGHAM, OF LEXINGTON, VIRGINIA, ASSIGNOR OF ONE-HALF TO JOSIAH KOLP, OF BUENA VISTA, VIRGINIA.

NUT-LOCK.

SPECIFICATION forming part of Letters Patent No. 589,689, dated September 7, 1897.

Application filed November 5, 1895. Serial No. 568,054. (No model.)

*To all whom it may concern:*

Be it known that I, JOHN P. BIRMINGHAM, a citizen of the United States, residing at Lexington, in the county of Rockbridge and State of Virginia, have invented certain new and useful Improvements in Nut-Locks; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in nut-locks; and the special object of the invention is to provide a lock by which the nut will be securely held to the threads of the bolt by a simple and inexpensive device.

The invention relates, further, to the construction of a nut of the character described which is provided with a V-shaped recess opening into its bore, and seated in the apex of the said recess is a steel point or blade which is designed to buckle against the thread of the bolt in order to check the unloosening of the nut and after the center of the recess is passed. The said blade is designed to ride on the thread while the nut is being unscrewed.

A further object of the present invention is to construct the blade or spring, which is seated in a recess off the bore of the nut, with a notch in its free end, which notch is adapted to straddle the thread of the bolt and bear snugly against the sides of the thread, and when it is desired to remove the nut or there is any tendency for the nut to loosen the said blade will bite into the beveled thread and hold when inclined in one direction, and it can be reversed in inclination only by flexing under strong force, after which the blade rides on the thread of the bolt without mutilating the thread in any shape.

To these ends and to such others as the invention may pertain the same consists in the novel construction, combination, and adaptation of parts, as will be hereinafter more fully described, and then specifically defined in the appended claims.

I clearly illustrate my invention in the accompanying drawings, which, with the letters of reference marked thereon, form a part of this specification, and in which drawings similar letters of reference indicate like parts throughout the several views, in which—

Figure 1:
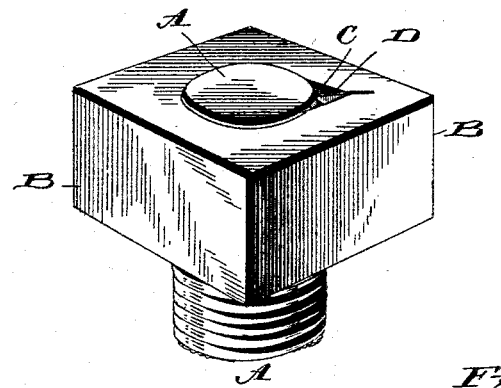
Figure 2:
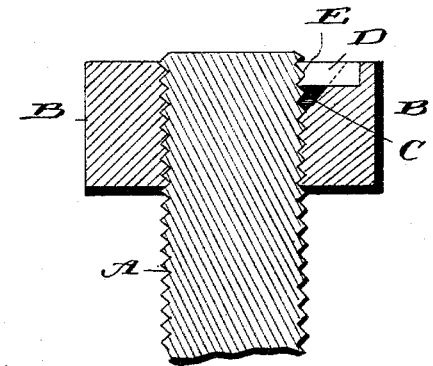
Figure 3:
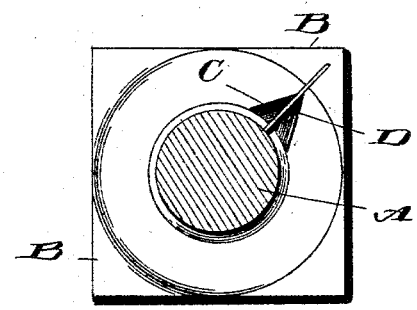

Figure 1 is a perspective view of a bolt having applied thereto a nut equipped with my nut-locking device. Fig. 2 is a central longitudinal view through the nut and bolt. Fig. 3 is an end view of the bolt and nut with locking-blade secured thereto.

Reference now being had to the details of the drawings by letter, A designates a bolt of ordinary construction, and B a nut which is made with a recess C, preferably V-shaped, and opening into the bore of the nut. Within this recess is seated the blade or thread-engaging member D. The free end of the spring D is notched, as at E, and is designed to straddle the thread of the bolt, and the edges of the notches conform to the taper or bevel of the thread, so that the free end of the blade will travel on the thread of the bolt when the nut is being turned in either direction. The free portion of the blade is of such a length for its free portion relatively to the distance from the apex of the notch in the nut to the bottom of the threads, or it may be to the apex of the threads, that it will there bite and hold when inclined in one direction, and that it can be reversed in inclination only by its flexing under a strong force.

From the foregoing construction it will be observed that I provide a locking attachment for a nut which will hold the nut against unscrewing at any portion of the thread and only bite into the bevel of the thread or the apices of the grooves while the blade is buckling, after which in the further loosening or tightening of the nut the notched end of the blade will ride on the thread without cutting into or otherwise mutilating the thread of the bolt.

Having thus described my invention, what I claim to be new, and desire to secure by Letters Patent, is—

1. A nut-lock, comprising a threaded bolt, a nut, a spring-blade having one end seated in the apex of a V-shaped recess opening off from the bore of the nut and having its free end formed to engage the threaded portion of the bolt, the spring being capable of biting the threads at one inclination, and, while so biting, of bending and reversing its inclination, as and for the purpose set forth.

2. A nut-lock, comprising a threaded bolt, a nut, a spring-blade having one end seated in the apex of a V-shaped recess opening off from the bore of the nut and having its free end formed to engage the threaded portion of the bolt, aside from its apices, the spring being capable of biting the threads at one inclination, and, while so biting, of bending and reversing its inclination, as and for the purpose set forth.

In testimony whereof I affix my signature in presence of two witnesses.

JOHN P. BIRMINGHAM.

Witnesses:
A. L. HOUGH,
H. C. GROVE.